United States Patent Office.

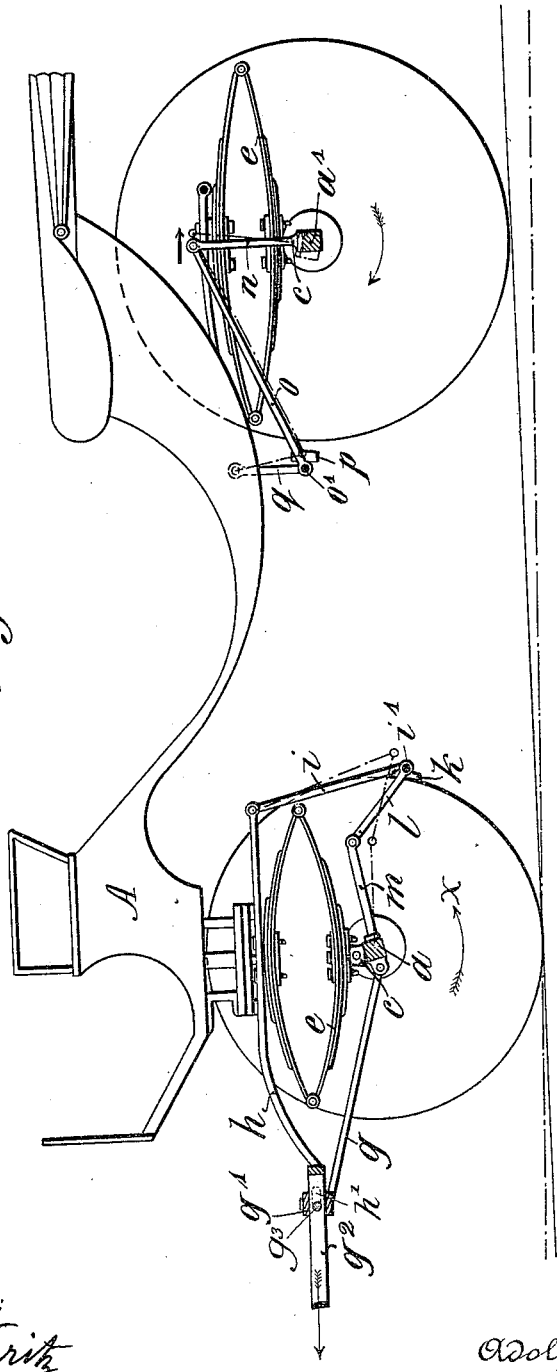

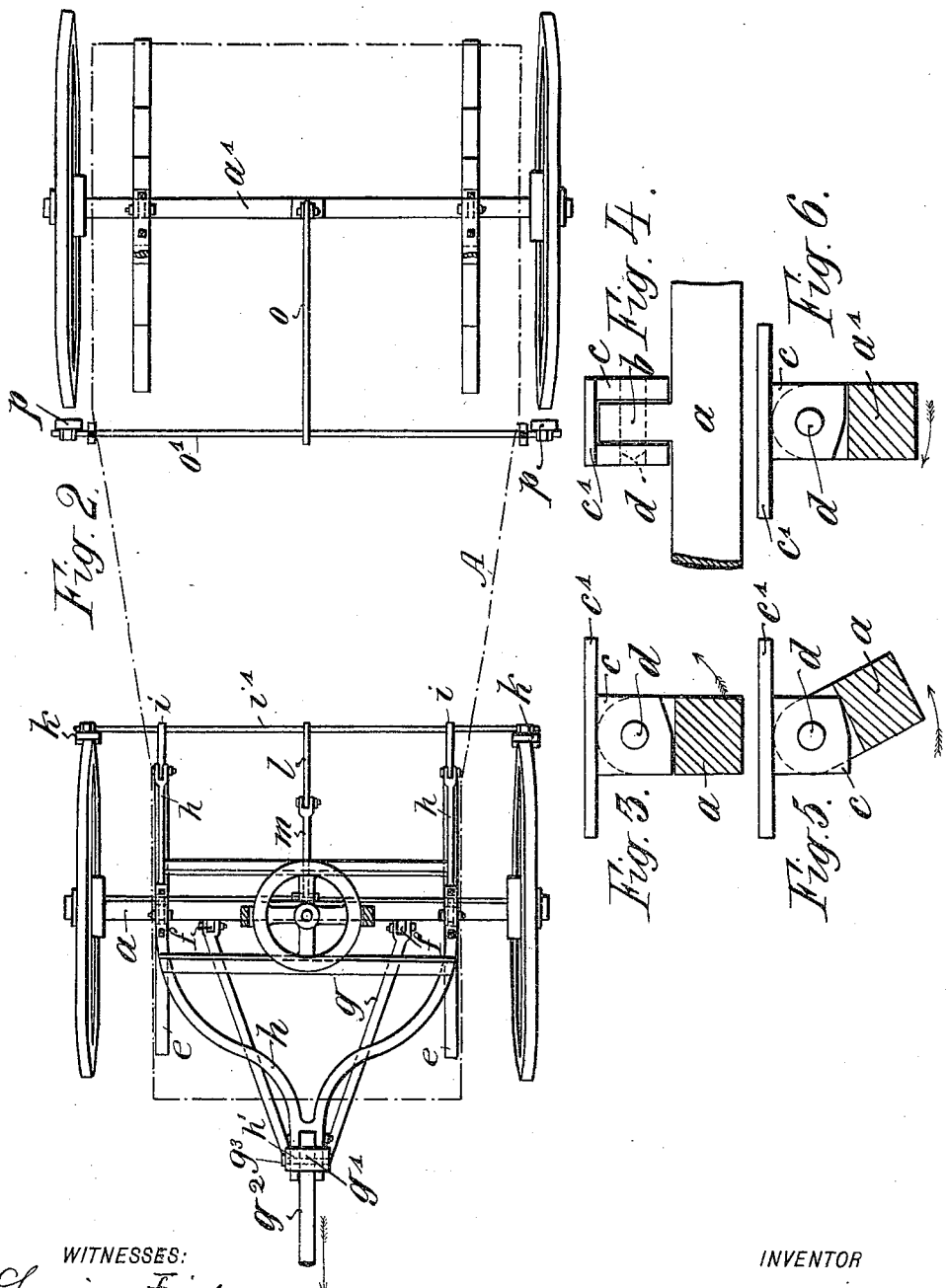

ADOLF KLIETSCH, OF GÖRLITZ, GERMANY, ASSIGNOR OF ONE-HALF TO LOUIS HOFFMANN, OF SAME PLACE.

VEHICLE-BRAKE.

SPECIFICATION forming part of Letters Patent No. 544,309, dated August 13, 1895.

Application filed October 1, 1894. Serial No. 524,624. (No model.) Patented in Germany July 9, 1894, No. 80,167; in Austria July 11, 1894, No. 44/4,583; in Hungary July 14, 1894, No. 1,497; in Switzerland August 13, 1894, No. 9,000; in France September 17, 1894, No. 241,445, and in Italy September 23, 1894, No. 37,262/105.

*To all whom it may concern:*

Be it known that I, ADOLF KLIETSCH, a subject of the Emperor of Germany, residing at Görlitz, in the Province of Silesia, Germany, have invented certain new and useful Improvements in Automatic Brakes for Vehicles, (for which I have obtained Letters Patents in Germany, No. 80,167, bearing date July 9, 1894; in Austria, No. 44/4,583, bearing date July 11, 1894; in Hungary, No. 1,497, bearing date July 14, 1894; in Switzerland, No. 9,000, bearing date August 13, 1894; in France, No. 241,445, bearing date September 17, 1894, and in Italy, No. 37,262/105, bearing date September 23, 1894,) of which the following is a specification.

My invention relates to automatic brakes applicable to vehicles of any description; and the object thereof is to provide two brakes, one of which is designed to automatically check the movement of the vehicle to which it is applied when going downhill and automatically be released when the vehicle moves on a level road, and the other brake is provided to check a retrograde movement of the vehicle when the latter is directed uphill, but prevented from proceeding, and this brake is automatically released when the vehicle is moving either uphill or downhill or on a level road.

The invention consists, first, of a brake comprising a partially-rotatable axle of a vehicle, an arm thereon, a brake-beam with brake-shoes suspended from the vehicle-body by links, a connecting-link between the brake-bar and the said axle-arm, and means connected with the vehicle-pole for causing a partial rotation of the axle when the brake is to be applied.

The invention consists, secondly, of a brake comprising a partially-rotatable axle provided with an arm, a brake-bar suspended from the vehicle body or frame by links, and a connecting-link between the said brake-bar and the said axle-arm; and the invention further consists of the improvements hereinafter more fully described, and pointed out in the claims.

The invention will be more fully understood taken in connection with the accompanying drawings, forming part hereof, and in which—

Figure 1 is an elevation, partly in section, of a vehicle provided with my improved automatic brakes. Fig. 2 is a plan view of the vehicle-gear, with the body shown in dotted lines; and Figs. 3 to 6 show the journals of the partially-rotatable front and rear axles of a vehicle and the different positions of the axles which cause the application and release of the brakes.

Referring now to the drawings for a further description of my invention, A is the body of the vehicle.

$a$ is the front axle, and $a'$ the rear axle, of the vehicle. Both of these may be rotatably attached directly to the body A by means of journal-brackets $c$, or springs $e$ may be interposed between the body A and the journal-brackets $c$, as shown. The point of rotation of each axle $a$ and $a'$ is at $d$, Figs. 3 to 6, and above the longitudinal axis of the axles, and the direction of rotation of the same is opposite to each other, that of the front axle $a$ being toward the rear of the vehicle, while the direction of rotation of the rear axle $a'$ is toward the front of the vehicle, as indicated by the arrows, Figs. 1, 3, 5, and 6.

The rear axle $a'$ is partially rotated in the direction indicated only when the vehicle is directed uphill and is prevented from one cause or another from proceeding in that direction, while the front axle is partially rotated in the direction indicated by the arrows $x$ in Figs. 1, 3, and 5 when the vehicle is moving either downhill or when suddenly stopped by a resistance applied to the pole $g^2$.

The brake for checking the movement of the vehicle when descending a hill or when a resistance is applied to the vehicle-pole $g^2$ is preferably operated by the front axle $a$ and consists of a brake-bar $i'$, having brake-shoes $k$, suspended from the body A, or, as shown, from the rear end of the hounds $h$ by the links $i$, Figs. 1 and 2. An arm $m$ is rigidly secured to the said axle $a$, and a connecting-link $l$ is interposed between the free end of the arm $m$ and the brake-bar $i'$, so that when the axle $a$ turns into the position shown in Fig. 1 the brake-shoes $k$ are applied to the front wheels of the vehicle, while when the said axle is in its normal position the brake-shoes are disengaged from the said wheels, the movements of the different links and arms being shown in dotted lines in Fig. 1.

The means above mentioned for applying the brake-shoes $k$ to the front wheels are sufficient when the weight of the vehicle and load carried thereby shall cause the checking of undesired movements of the vehicle; but such checking may also, either solely or in addition to the above, be facilitated by mechanical means provided between the pole $g^2$ and the axle $a$. Such mechanical means consist, preferably, of a forked link $g$, whose prongs are pivotally attached to the axle $a$ at $f$, and the united ends of the prongs are formed into a collar $g'$. The united ends of the hounds $h$ are bifurcated to receive the pole $g^2$, and this bifurcated end is provided with slots $h'$. A bolt $g^3$ passes through holes provided in the collar $g'$, the slots $h'$ of the hounds $h$, and the pole $g^2$ in such a manner that when the pole is drawn in the direction of the arrow, Figs. 1 and 2, the collar $g'$ and links $g$ are drawn in the same direction and turn the axle $a$ oppositely to the direction indicated by the arrow $x$, causing the release of the brake-shoes $k$; but when the pole $g^2$ is pushed in the opposite direction the axle $a$ turns in the direction of the arrow $x$ and applies the brake, as will be readily understood, the slots $h'$ in the hounds $h$ serving to limit the movement of the bolt $g^3$ and pole $g^2$ in either direction.

The arrangement and operation of the brake connected to the rear axle $a'$, which latter partially rotates only when the vehicle in passing uphill is stopped, as before mentioned, are much the same as that described in connection with the brake of the front axle $a$ and are as follows: From the vehicle-body A is suspended, by means of links $q$, a brake-bar $o'$, carrying brake-shoes $p\,p$. The axle $a'$ is journaled in the brackets $c$, fastened either to the springs $e$ or the body A of the vehicle, and rotates partially about the pins $d$. An arm $n$ is rigidly secured to the said axle $a'$, and the free extremity thereof is connected with the brake-bar $o'$ by the links $o$. When the vehicle is moving on a level road, downhill, or uphill, the axle remains in its normal position and as shown in Fig. 1, in which the brake is shown released; but if the vehicle is directed uphill and stopped for any reason, the weight of the vehicle and its load causes the axle $a'$ to be turned in the direction indicated by the arrow and applies the brake-shoes $p\,p$ to the wheels of the vehicle. It may here be remarked that the pressure with which the shoes impinge on the rear wheels increases with the weight of the wagon and load carried thereby.

It will be understood that modifications of construction may be made without departing from the spirit of the invention. For instance, the springs $e$ may be omitted and two arms $m$ and $n$ may be provided on each axle $a$ and $a'$; also the links $g$ and collar $g'$ may be omitted, in which case the pole $g^2$ is directly coupled to the hounds $h$ or the vehicle-body A. Furthermore, two hounds $h$, two links $g$, and two poles $g^2$ may be employed and arranged to suit a vehicle drawn by one horse, the coupling of the hounds, links, and poles being as described.

Having thus described the nature and objects of my invention, what I claim as new, and desire to secure by Letters Patent, is—

1. In a vehicle an axle partially rotatable about a journal disposed above the said axle, in combination with a brake-bar suspended by links from the vehicle-body, brake-shoes on said brake-bar, an arm rigidly secured to said axle and a link between the free extremity of said arm and said brake-bar, substantially as and for the purposes set forth.

2. In a vehicle an axle hinged in brackets secured to the vehicle-body and having its pivotal points above the center of the axle, in combination with a brake-bar suspended from the said body by links, one or more arms rigidly secured to the said axle, a link or links connecting the said arm or arms with the said brake-bar, substantially as and for the purposes set forth.

3. In a vehicle an axle hinged in brackets whose pivotal points are above the center of the axle, an arm on said axle, a brake-bar suspended from the vehicle-body by links, brake-shoes on said bar, a link between the said arm and said brake-bar, a forked link pivotally secured to said axle and connected to the vehicle pole by a bolt, substantially as and for the purposes set forth.

4. In a vehicle an axle hinged in brackets whose pivotal points are above the center of the axle, an arm on said axle, a brake-bar suspended from the vehicle-body, brake-shoes on said bar, a link connecting the said arm with the brake-bar, a forked link pivotally secured with its prongs to said axle the united end of the prongs being formed into a collar, hounds attached with one end to the said vehicle-body and having their other ends contracted, bifurcated and slotted to engage the said collar, a pole engaging the said bifurcation and a bolt passing through holes in the collar, the pole and the said slots in the hounds, substantially as and for the purposes set forth.

5. In a vehicle an axle hinged to the vehicle-body above its center, a brake-bar suspended from the said body and carrying brake-shoes, an arm on said axle, a link connecting said arm with said brake-bar, a pole and links between said pole and the said axle, substantially as and for the purposes set forth.

6. In a vehicle an axle hinged to the vehicle-body above its center, a brake-bar suspended from the said body and carrying brake-shoes, an arm on said axle, a link connecting said arm with said brake-bar, hounds secured at one end to said vehicle-body, and having their free extremity slotted, links pivotally attached to said axle, poles attached to said hounds and links by bolts, substantially as and for the purposes set forth.

Signed at Zittau, in the Kingdom of Saxony, Germany, this 15th day of September, in the year 1894.

ADOLF KLIETSCH.

Witnesses:
E. T. RÄTJE,
ERNST LOUIS WENZEL.